United States Patent [19]

Kaneko et al.

[11] Patent Number: 4,643,562
[45] Date of Patent: Feb. 17, 1987

[54] EXPOSURE CORRECTION METHOD

[75] Inventors: Rokusaburo Kaneko; Yuji Takenaka, both of Kaisei, Japan

[73] Assignee: Fuji Photo Film Co., Ltd., Kanagawa, Japan

[21] Appl. No.: 758,272

[22] Filed: Jul. 24, 1985

Related U.S. Application Data

[63] Continuation-in-part of Ser. No. 601,849, Apr. 19, 1984, abandoned.

[30] Foreign Application Priority Data

Apr. 27, 1983 [JP] Japan ................................. 58-74821

[51] Int. Cl.$^4$ ...................... G03B 27/34; G03B 27/40
[52] U.S. Cl. .................................................... 355/56
[58] Field of Search ................................. 355/55, 56

[56] References Cited

U.S. PATENT DOCUMENTS 3,832,058  8/1974  Gusovius ............................. 355/56
4,140,392  2/1979  Lacombat et al. .................... 355/56
4,171,904 10/1979  Tani ..................................... 355/55

Primary Examiner—Monroe H. Hayes
Attorney, Agent, or Firm—Wenderoth, Lind & Ponack

[57] ABSTRACT

Photographic printers are provided with a plurality of lenses with different magnifications. In order to change the size of the enlargement (or magnification of the enlargement), it is necessary for an operator to manually replace a lens or to select a suitable lens from among the plural lenses on a revolving lens turret by pressing a selector button. An exposure correction method is provided for a printer system in which lens units are selected such that when a lens unit is selected from among plural lens units having different focal lengths in accordance with a designated magnification, a conjugate length is calculated on the basis of the magnification and the focal length of the lens unit so as to select an optimum lens unit falling within the effective range of the system, and that the exposure is corrected on the basis of the relationship:

$$T_n/T(n-1) = \alpha \{F(n-1)/F_n \times B_n/B(n-1)\}^{2k}$$

wherein $T_n$ represents the exposure time of a lens unit which is n-th in focal length, and $F_n$ is the focal length of the n-th lens unit, and $B_n$ is the distance between the lens unit and the projection plane and $\alpha$ is the coefficient of correction for a diaphragm aperture value ratio between the n-th and n-1th lens units.

3 Claims, 6 Drawing Figures

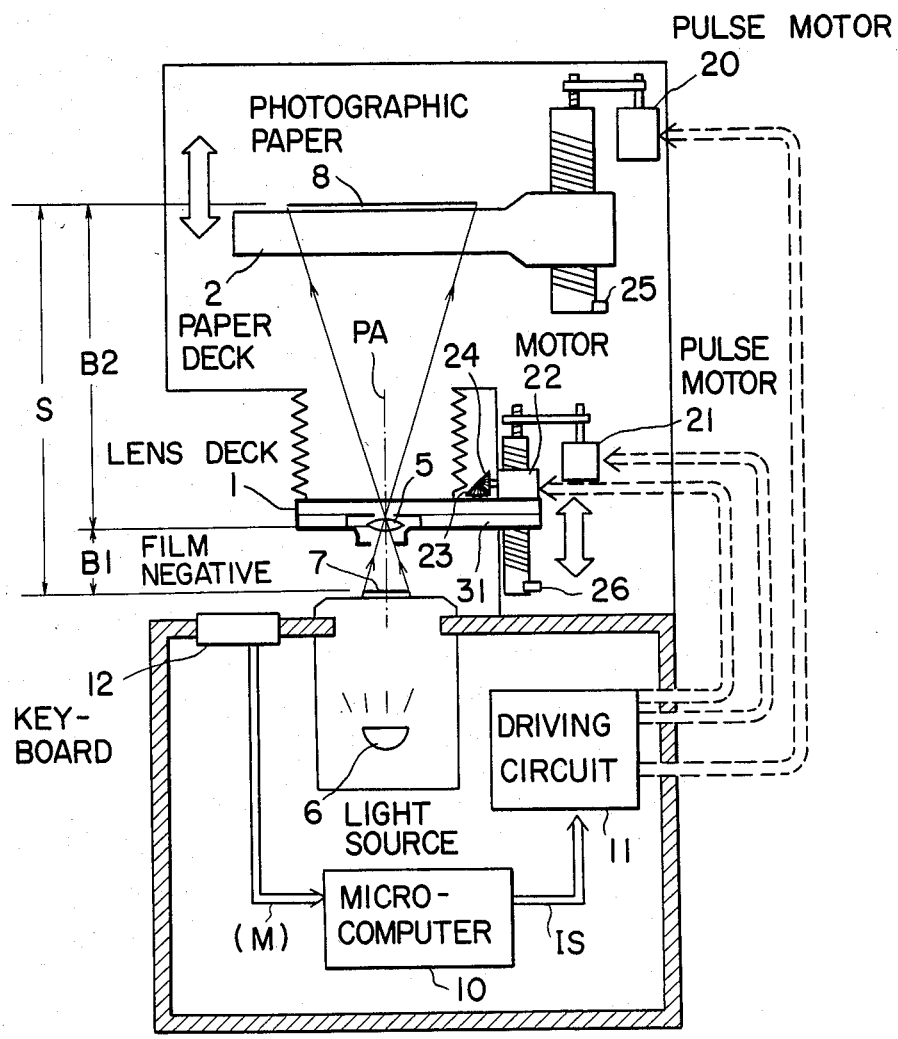

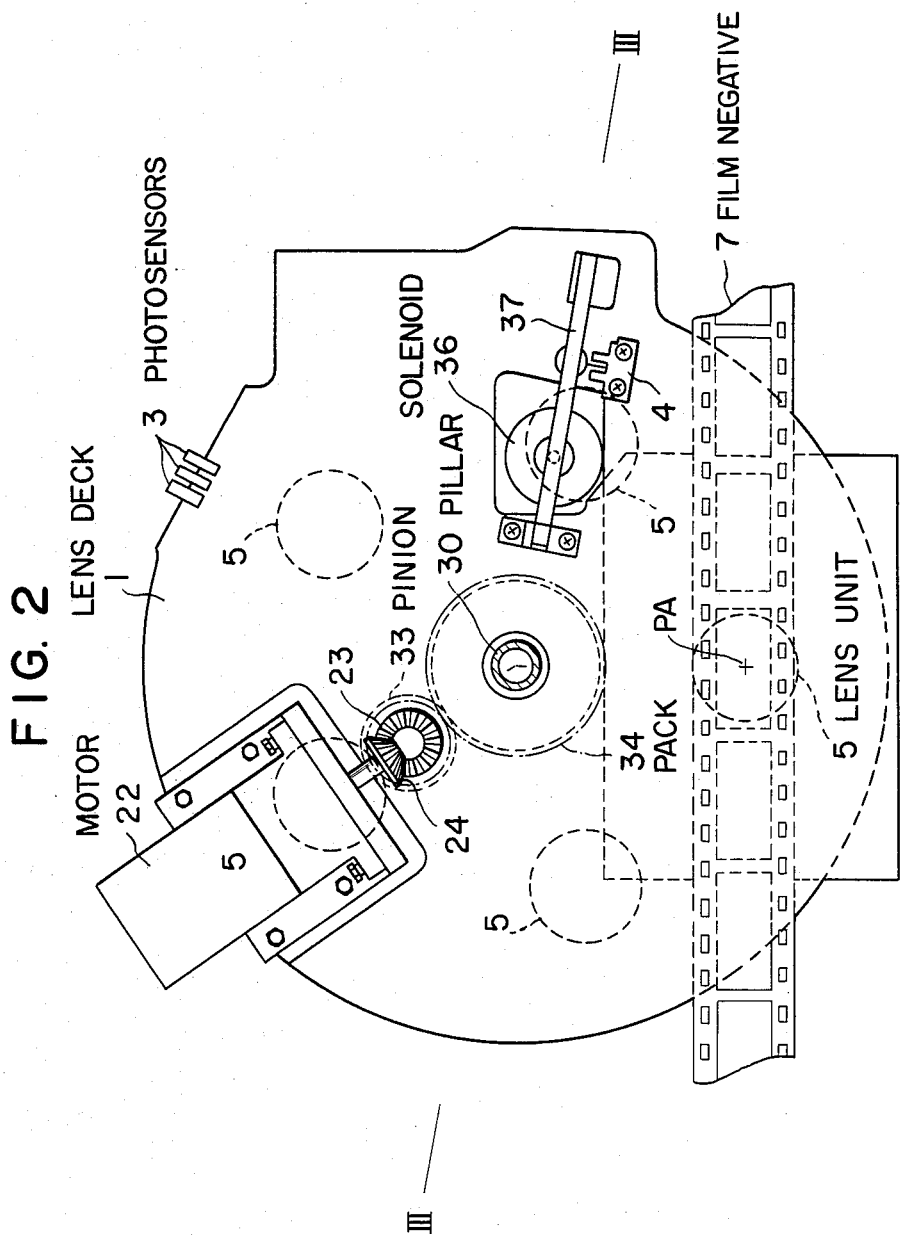

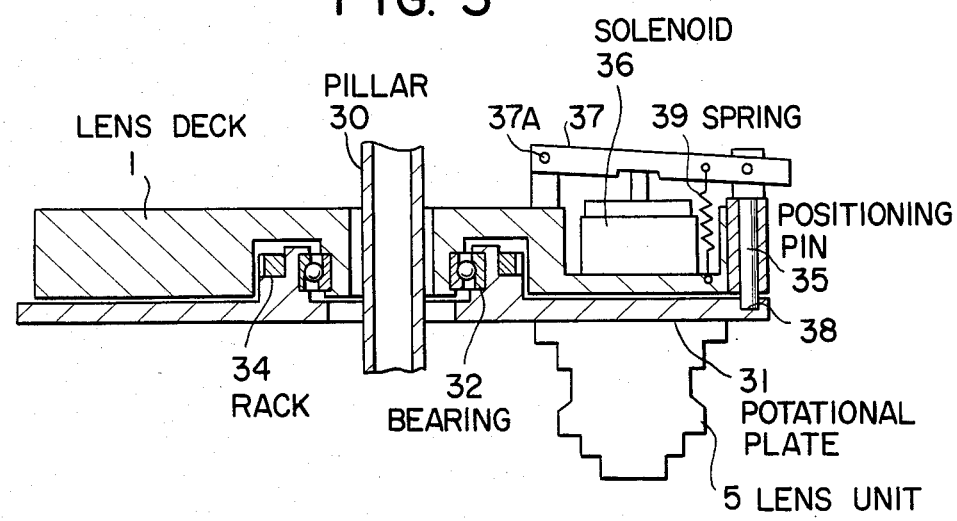
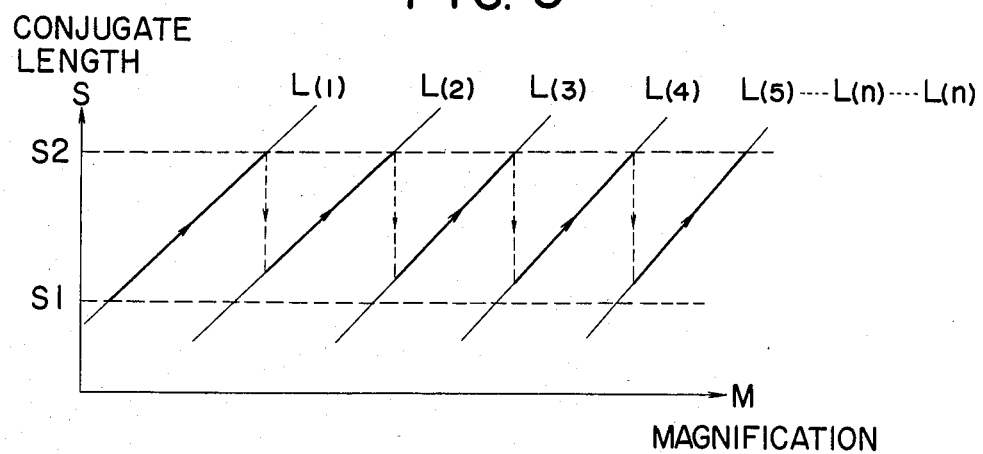

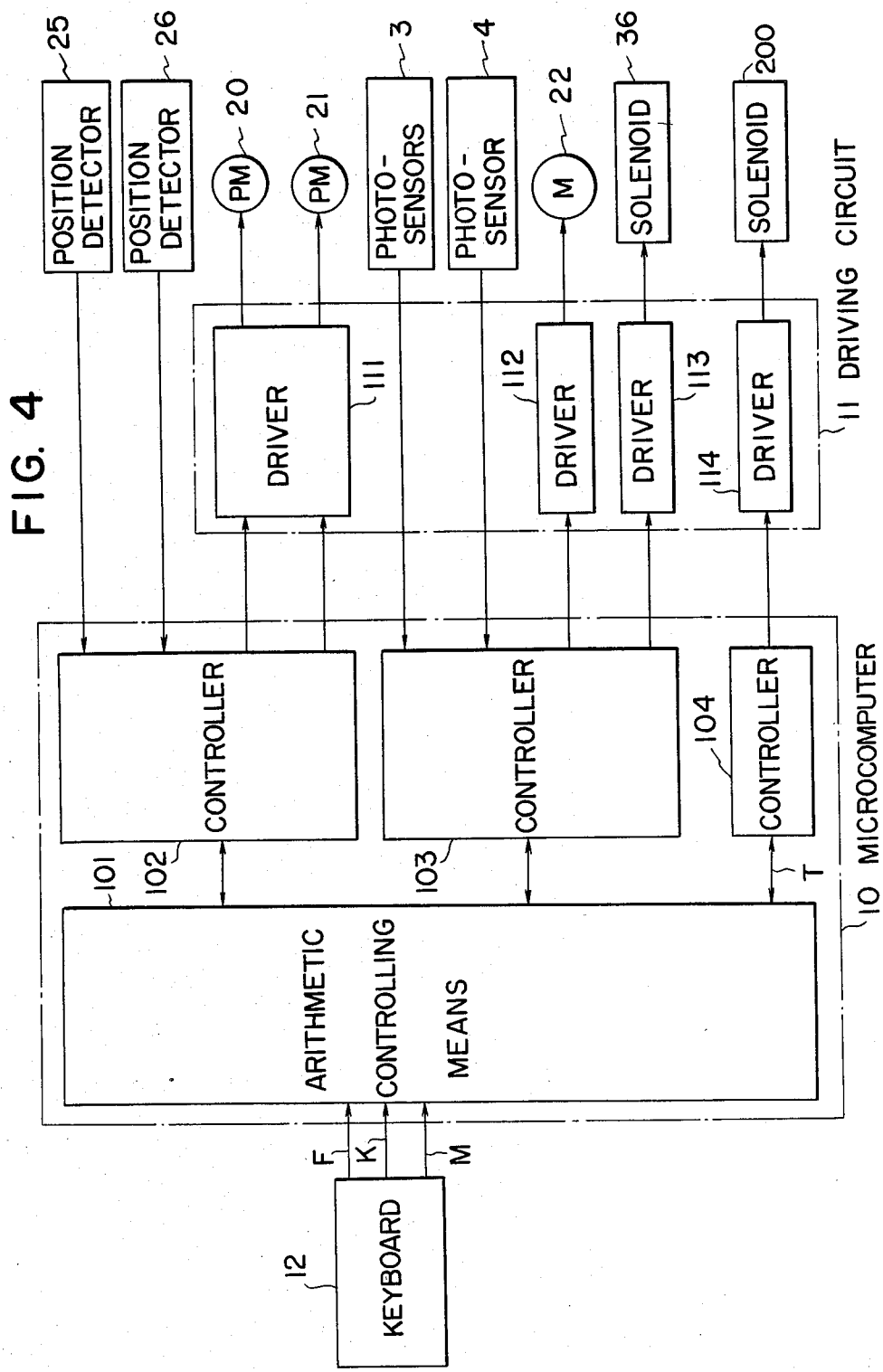

4,643,562

EXPOSURE CORRECTION METHOD

CROSS-REFERENCE TO RELATED APPLICATION

This application is a continuation in part of our prior application Ser. No. 601,849, filed on Apr. 19, 1984, entitled "EXPOSURE CORRECTION METHOD", and now abandoned.

BACKGROUND OF THE INVENTION

The present invention relates to a method for correcting exposure for a lens unit selected from a plurality of lens units with different focal lengths mounted in a photographic printer and the like.

Some of the conventional photographic printers are provided with a plurality of lenses with different magnifications. In order to change the size of an enlargement (or magnification of enlargement), it is necessary for an operator to manually replace a lens or to select a suitable lens from among the plural lenses on a revolving lens turret by pressing a selector button. In this manipulation, the selection of lens and the correction of exposure for the selected lens are left to the operator's judgement. Replacement of lenses in accordance with the change in the size of the englargement involves much trouble by itself as does the calculation of the exposure as well. The conventional printers are thus defective in that the printing process does not proceed smoothly.

SUMMARY OF THE INVENTION

An object of the present invention is to provide a method for correcting the exposure of a photographic printer or the like in accordance with the change in the enlargement rate by automatically replacing the lenses and by automatically calculating the changes in exposure.

Another object of the present invention is to provide an exposure correction method with which a conjugate length is sought from the magnification and the focal length of the lens which are inputted as instructed so as to quickly select the lens which falls within the effective range of the printer and to automatically correct the exposure in correspondence with the selected lens.

Accordingly, there is provided an exposure correction method for a system in which lenses are selected characterized in that when a lens is selected from a plurality of lenses having different focal lengths in accordance with a designated magnification, a conjugate length is calculated on the basis of the magnification and the focal length of the lens so as to select an optimum lens falling within the effective range of the system, and that the exposure is corrected on the basis of the relationship $$T_n/T(n-1) = \alpha \{F(n-1)/F_n \times B_n/B(n-1)\}^{2k}$$

wherein $T_n$ represents the exposure time of a lens which is n-th in the focal length, $F_n$ is the focal length, $B_n$ is the distance between the lens and the projection plane and $\alpha$ is the coefficient of correction for the diaphragm value ratio.

The nature, principle and utility of the invention will become more apparent from the following detailed description when read in conjunction with the accompanying drawings.

BRIEF DESCRIPTION OF THE DRAWINGS

In the accompanying drawings:

FIG. 1 is a schematic view showing a photographic printer to which the present invention is applied;

FIG. 2 is a plan view of the lens deck in the photographic printer;

FIG. 3 is a sectional view of the lens deck at line III—III thereof;

FIG. 4 is a block diagram showing the control system of the photographic printer;

FIG. 5 is a schematic diagram showing an example of the lens unit selection.

DETAILED DESCRIPTION OF THE INVENTION

Figure 6:
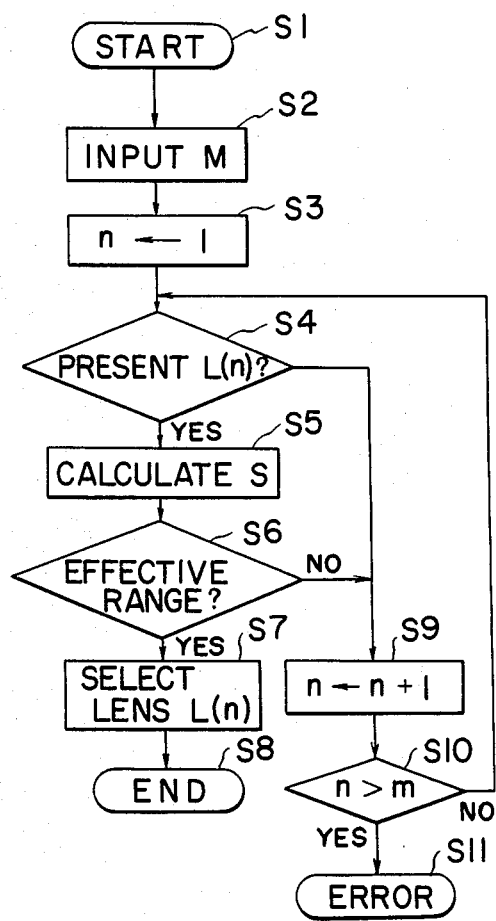
FIG. 6 is a flowchart showing how the lens units are selected.

The present invention will now be described in detail.

Referring to FIG. 1 which shows a schematic view of a photographic printer with a mechanism of which the enlarging magnification is variable, the light from a light source 6 illuminates a film negative 7 and is exposed on a photographic paper 8 as it is transmitted through a lens unit 5 which forms an optical system. At this time a frame image of the film negative 7 is enlarged or reduced by the lens unit 5 and is exposed on the photographic paper 8. The lens unit 5 is mounted on a rotational plate 31 which is rotatable and has a plurality of lens units with different focal lengths, and the photographic paper 8 is provided on a paper deck 2. A lens deck 1 is engaged with the rotational plate 31 in a body. When the position of the film negative 7 is fixed, it is possible to freely set the enlarging magnification by elevating the positions of the photographic paper 8 and the lens unit 5 or by changing the focal length of the lens unit 5. Assuming that the distance between the film negative 7 and the lens unit 5 is B1, the distance between the lens unit 5 and the photographic paper 8 is B2 and that the focal length of the lens unit 5 is f so as to focus the image of the film negative 7 on the photographic paper 8, it is necessary to establish the following equation.

$$1/f = 1/B1 + 1/B2 \tag{1}$$

At this condition, the enlarging magnification M is expressed as follows;

$$M = \frac{B2}{B1} = \frac{S - B1}{B1} \tag{2}$$

The sum of the distances B1 and B2 will become the conjugate length S. The conjugate length S is the distance between the film negative and the photographic paper 8 and is therefore limited by the distance where the printer is mechanically movable in its maximum length. The maximum conjugate length with respect to the plural lens units must therefore be smaller than the maximum distance of the mechanical movement of the photographic printer. This is referred to as the effective range in the description hereinafter.

The elevating operation of the photographic paper 8 and the lens unit 5 are performed by moving the positions of the paper deck 2 and the lens deck 1 according to the driving of pulse motors 20 and 21, respectively. The rotational plate 31 to which the lens unit 5 is attached is rotated through a motor 22 and bevel gears 23 and 24 which are incorporated with the motor 22 and the lens deck 1, and a plurality of lens units with different focal length are mounted on the rotational plate 31 which is circular in shape. One of the lens units is selectively positioned at a printing optical axis PA by rotating the rotational plate 31. Instruction signals IS outputted from microcomputer 10 are supplied to the pulse motors 20 through 22 through a driving circuit 11. The enlarging magnification M is manually inputted to the microcomputer 10 from an external keyboard 12. Position detectors 25 and 26 are operatively engaged with the paper deck 2 and lens deck 1, respectively.

The operation will now be explained in detail referring to FIGS. 2 and 3. FIG. 2 shows a view of the lens deck 1 and FIG. 3 is a sectional veiw of III—III in FIG. 2.

The control of the height positions B1 and B2 of the photographic paper 8 and the lens unit 5 is carried out as follows; First, the paper deck 2 and the lens deck 1 are elevated by the driving of the pulse motors 20 and 21 through the microcomputer 10 and are respectively stopped at their respective reference positions. The lens deck 1 elevates along a center pillar 30 with the rotational plate 31. The positions thereof to be stopped are respectively detected by the position detectors 25 and 26 and then the detecting signals are respectively inputted to the microcomputer 10. Since the distances B1 and B2 are set in advance in the microcomputer 10 according to the enlarging magnification M inputted by the keyboard 12, the required pulses are calculated in the microcomputer 10 and then supplied to the pulse motors 20 and 21 through the driving circuit 11 so that the distance B1 and B2 respectively become equal to the predetermined values.

Referring to FIGS. 2 and 3 which show schematic views of the lens deck 1 attached to the photographic printer, the rotational plate 31 which is rotatable around the pillar 30 is operatively attached to the back surface of the lens deck 1 through a bearing 32. A plurality of lens units are mounted on the back surface of the rotational plate 31 with the adequate intervals for the rotational direction, and the respective lens units have some lenses for focusing the image. The rotation of the rotational plate 31 is performed by the driving of the motor 22 which is mounted on the surface of the lens deck 1. Namely, the bevel gear 24 is mounted at the output axis of the motor 22, the bevel gear 24 is operatively incorporated with the bevel gear 23 which is connected to a pinion 33 which is in the back side of the lens deck 1. The pinion 33 is engaged with a ring shape rack 34 which is provided at the upper portion of the rotational plate 31 and at around the center pillar 30 so as to thereby rotate the rotational plate 31 around the pillar 30 through pinion 33 and the gears 23 and 24 by driving the motor 22. The rotation of the rotational plate 31 is exactly positioned by a positioning pin 35 so that the selected lens unit 5 accurately coincides with a printing optical axis PA as shown in FIG. 2.

The positioning pin 35 is mounted to the tip of a lever 37 which receives a driving force of a solenoid 36 or a tensile force of a spring 39. The lever 37 is swung around an axis 37A by the driving force or the tensile force. The positioning pin 35 is pulled out from a positioning hole 38 which is formed on the rotational plate 31 at predetermined intervals by exciting the solenoid 36, and then the rotational plate 31 is rotated around the pillar 30 by driving the motor 22. The tip of the positioning pin 38 is inserted into the positioning hole 38 due to the tensile force of the spring 39 by disabling the solenoid 36 so as to thereby precisely position the desired lens unit 5 to the printing optical axis PA. The operational condition of the lever 37 is detected by a photosensor 4, and the detecting signal is inputted to the microcomputer 10.

Discrimination holes are provided on the circumference of the rotational plate 31 corresponding to the respective lens units, and the lens unit which is positioned at the printing optical axis PA is always detected by discriminating the discrimination holes with the photosensors 3 which are provided at the peripheral portion of the lens deck 1. Furthermore, the focal lengths for respective lens units are stored in the microcomputer 10 in advance.

The circuit system of the printer is shown in FIG. 4 in detail. The focal length F, the correction amount K for printing and the enlarging magnification M from the keyboard 12 are inputted to an arithmetic controlling means 101 in the microcomputer 10. The microcomputer 10 has controllers 102, 103 and 104; the controller 102 controls the position of the lens deck 1 and the paper deck 2; the controller 103 controls the position of the lens units and the controller 104 controls a solenoid 200 for a shutter (not shown) according to the exposure time T.

Driving circuit 11, having drivers 111, 112, 113, and 114, is used to interface the microcomputer 10 with the motors and solenoids.

With the above construction, an arbitrary lens unit on the rotational plate 31 is selected and positioned at the printing optical axis according to the instruction signals IS from the microcomputer 10.

Here, the plural lens units mounted on the rotational plate 31 are represented by L(1), L(2), . . . L(n), . . . L(m), the focal length by L(1)>L(2)>L(3) . . . >L(n) . . . >L(m), and the effective range of the conjugate length S by $S_1$ to $S_2$ as shown in FIG. 5. The letter n denotes a unit number.

In order to select a lens unit which minimizes insufficient peripheral exposure or distortion, the arrangement of lens units is consecutively scanned to detect the presence of a lens unit, starting from the lens unit of the longest focal length and if the presence of a lens unit is detected, a conjugate length S is sought from the designated magnification M and the focal length F(n). In case the conjugate length S does not fall within the effective range, a lens unit having a second longest focal length is selected. In this manner, a lens unit having a longest focal length with respect to a given magnification of enlargement is selected at all times. This is because a lens unit with a smaller focal length is generally more susceptible to effects caused by insufficient peripheral exposure or distortion when a given film negative size is enlarged by the same magnification.

One example of the operation will be described in more detail referring to the flowchart shown in FIG. 6.

As an operator inputs new data M to change the magnification for enlargement (Steps S1 and S2), n is designated as "1" to select a lens unit L(1) with the longest focal (Step S3) and whether or not such a lens unit L(1) is present is judged (Step S4). In case the lens unit L(1) is present, the conjugate length S is calculated from an equation $S = F \cdot (M + 1/M + 2)$ wherein M is the input magnification and F the focal length of the lens unit (Step S5) to decide whether the conjugate length S falls within the effective range of the photographic printer (Step S6). If YES, the lens selection has been completed with the lens unit L(1) being selected (Steps S7 and S8). If NO, no lens unit is available at the Step S4 or the lens unit falls outside the effective range at the Step S6, an operation with "+1" will be conducted to select a lens with the second longest focal length (Step S9). Upon the operation, the value obtained is judged to determine whether or not it is greater than that of the lens with the smallest focal distance L(m) (Step S10). In case the selected lens unit is smaller in the focal length than the lens unit with the smallest focal length, the operation is judged erroneous (Step S11). In case the value obtained is acceptable, the above procedure is repeated starting from the Step 4 skipping the steps S1 through S3. Thus, as shown by the arrows in FIG. 5, a lens unit with a focal length falling within the range of conjugate length of the designated magnification M can be automatically selected by starting from a lens unit L(1) with the longest focal length and proceding in succession to a lens unit L(m) with the smallest focal length.

The foregoing description relates to an embodiment wherein a lens unit is selected starting from the one with the longest focal length, but the method of the present invention is not limited by this example. Any other procedure can be employed so long as the optimum lens unit is automatically selected. For instance, the optimum lens unit may be selected by searching from the lens unit with the smallest focal length.

With the lens unit thus selected, we now proceed with another aspect of the method according to the present invention, that is, the automatic exposure correction. To do this, a coefficient of correction between two adjacent lens units is inputted in advance so that it can be introduced in the equation for calculating the exposure. When the lens unit is exchanged in accordance with the change in magnification of enlargement, the use of the above equation obviates influences caused by the lens unit exchange and controls the exposure in a continuous manner at the level as if the same lens unit were in use.

Suppose the magnification M is changed while maintaining the same lens unit, the exposure time T is expressed by the following equation (3):

$$T_1 = T_2 \times \{(M_1/M_2)^2 \times (B11/B12)^2\}^k \quad (3)$$
$$= T_2 \times (B_{21}/B_{22})^{2k}$$

wherein $T_1$ represents the exposure time under a magnification $M_1$ with the distance $B_{11}$ being the distance between the film negative 7 and the lens unit 5 and the distance $B_{21}$ being the distance between the lens unit 5 and the projection plane 2. $T_2$ is the exposure time under a magnification $M_2$ with the distance $B_{12}$ being the distance between the film negative 7 and the lens unit 5 and the distance $B_{22}$ being the distance between the lens unit 5 and the projection plane 8 and k is a coefficient of correction, given as k>0.

Now, suppose a lens unit with the focal length F is replaced by a lens unit with the focal length F', the following is held based on the equation (3) above:

$$T_1' = T_2' \times (B_{21}'/B_{22}')^{2k} \quad (4)$$

When the diaphragm aperature values of the lens units are indentical, then $$T_2' = T_1 \quad (5)$$

$$\left. \begin{array}{l} 1/B_{11} + 1/B_{21} = 1/F \\ 1/B_{12}' + 1/B_{22}' = 1/F' \\ B_{21}/B_{11} = B_{22}'/B_{12}' = M \end{array} \right\} \quad (6)$$

Therefore, the following is established:

$$B_{22}' = B_{21} \times (F'/F) \quad (7)$$

Substituting the equations (5) and (7) into equation (4), we have:

$$T_1' = T_2 \times (F/F' \times B_{21}'/B_{22})^{2k} \quad (8)$$

Thus, by modifying the equation (8) in accordance with the general formula applicable to a case with a lens unit L(n) having the focal length of Fn and a lens unit L(n−1) having the focal length of F(n−1), the following equation (9) is obtained:

$$Tn/T(n-1) = \{F(n-1)/Fn \times Bn/B(n-1)\}^{2k} \quad (9)$$

wherein T represents the exposure time and B the distance between the lens unit 5 and the projection plane 8.

In case the diaphragm aperture value of the replacing lens differs from that of the replaced lens unit, a further correction is necessary. Then it is expressed as follows given the coefficient of correction as α:

$$Tn/T(n-1) = \alpha\{F(n-1)/Fn \times Bn/B(n-1)\}^{2k} \quad (10)$$

wherein α is a squared ratio of the diaphragm aperture value f(n) of the lens unit L(n) and the diaphragm aperture value f(n−1) of the lens L(n−1) and is expressed as $$\alpha = \{f(n)\}^2/\{f(n-1)\}^2 \quad (11)$$

Thus, in accordance with the present invention, a corrected exposure is obtained at all times even if a lens unit having the focal length F(n−1) is replaced by a lens unit with the focal length F(n) or vice versa, whereby maladjusted exposure due to exchange in lens units or reciprocity law failure can be avoided.

The above description is given in terms of a photographic printer as a preferred example of the present invention, but it does not limit the scope of the application. The present invention is applicable to any system which requires correction of exposure due to exchange of the lenses, such as a microfilm camera, a microfilm reader printer, a plate making camera, etc.

It should be understood that many modifications and adaptations of the invention will become apparent to those skilled in the art and it is intended to encompass such obvious modifications and changes in the scope of the claims appended hereto.

What is claimed is:

1. An exposure correction method for a system in which lens units are selected comprising the steps of:
   selecting a lens unit from a plurality of lens units having different focal lengths in accordance with a designated magnification;
   calculating a conjugate length on the basis of the magnification and focal length of the selected lens unit and selecting another lens unit from the plurality of lens units if necessary so as to select an optimum lens unit from the plurality of lens units based on predetermined parameters;

correcting the exposure of the system for the selected optimum lens unit in accordance with the equation:

$$Tn/T(n-1) = \alpha\{F(n-1)/Fn \times Bn/B(n-1)\}^{2k}$$

wherein: Tn is the exposure time of the nth lens unit and T(n−1) is the exposure time of the (n−1)th lens unit; Fn is the focal length of the nth lens unit and F(n−1) is the focal length of the (n−1)th lens unit; Bn is the distance between the nth lens unit and a projection plane of the system and B(n−1) is the distance between the (n−1)th lens unit and the projection plane of the system; $\alpha$ is the coefficient of correction for the ratio of the aperture and is equal to the squared ratio of the diaphragm aperture value of the nth lens with respect to the diaphragm aperture value of the (n−1)th lens; and k is a coefficient of correction constant which is greater than zero.

2. An exposure correction method as claimed in claim 1, wherein said lens units are selected and their conjugate length calculated consecutively so as to select the optimum lens unit starting from the lens unit with the longest focal length of the plurality of lens units.

3. An exposure correction method as claimed in claim 1, wherein said lens units are selected and their conjugate length calculated consecutively so as to select the optimum lens unit starting from the lens unit with the smallest focal length of the plurality of lens units.

* * * * *